US011106670B2

(12) United States Patent
Bauer et al.

(10) Patent No.: US 11,106,670 B2
(45) Date of Patent: Aug. 31, 2021

(54) LOCAL IDENTIFIERS FOR DATABASE OBJECTS

(71) Applicant: SAP SE, Walldorf (DE)

(72) Inventors: Andreas Bauer, Walldorf (DE); Maik Goergens, Nussloch (DE)

(73) Assignee: SAP SE, Walldorf (DE)

( * ) Notice: Subject to any disclaimer, the term of this patent is extended or adjusted under 35 U.S.C. 154(b) by 380 days.

(21) Appl. No.: 15/717,463

(22) Filed: Sep. 27, 2017

(65) Prior Publication Data

US 2019/0095485 A1   Mar. 28, 2019

(51) Int. Cl.
  *G06F 16/2453*   (2019.01)
  *G06F 16/22*     (2019.01)
  *G06F 16/2455*   (2019.01)

(52) U.S. Cl.
  CPC .... *G06F 16/24537* (2019.01); *G06F 16/2228* (2019.01); *G06F 16/24542* (2019.01); *G06F 16/24554* (2019.01)

(58) Field of Classification Search
  CPC ......... G06F 16/24537; G06F 16/24554; G06F 16/2228; G06F 16/24542
  See application file for complete search history.

(56) References Cited

U.S. PATENT DOCUMENTS

| | | | | |
|---|---|---|---|---|
| 4,769,772 A | * | 9/1988 | Dwyer | G06F 16/2453 707/714 |
| 5,551,027 A | * | 8/1996 | Choy | G06F 9/355 |
| 5,960,194 A | * | 9/1999 | Choy | G06F 9/355 |
| 6,438,562 B1 | * | 8/2002 | Gupta | G06F 16/2272 707/696 |
| 2003/0046505 A1 | * | 3/2003 | Craddock | G06F 12/1081 711/165 |
| 2005/0278316 A1 | * | 12/2005 | Carlson | G06F 16/24553 |

(Continued)

FOREIGN PATENT DOCUMENTS

EP    2527996 A1    11/2012

OTHER PUBLICATIONS

"European Application Serial No. 18184492.9, Extended European Search Report dated Oct. 15, 2018", 10 pgs.

*Primary Examiner* — Pierre M Vital
*Assistant Examiner* — Zuheir A Mheir
(74) *Attorney, Agent, or Firm* — Schwegman Lundberg & Woessner, P.A.

(57) ABSTRACT

Various examples are directed to systems and methods for utilizing local identifiers in a distributed database system. A database management system server may receive first execution unit data describing a first execution unit of a first database query. The first execution unit data may comprise first operand data describing a set of operands for the first execution unit. The database management system server may determine that the first operand data describes at least one operand from a first partition and at least one operand from a second partition. The database management system server may generate a first set of local identifiers describing rows at the first partition and a first set of local identifiers describing rows at the second partition. The database management system server may execute the first execution unit based at least in part on the first set of local identifiers describing rows at the first partition and the first set of local identifiers describing rows at the second partition.

15 Claims, 9 Drawing Sheets

(56) References Cited

U.S. PATENT DOCUMENTS

| | | | |
|---|---|---|---|
| 2006/0218123 A1* | 9/2006 | Chowdhuri | G06F 16/24532 |
| 2007/0016555 A1* | 1/2007 | Ito | G06F 16/2228 |
| 2008/0059440 A1* | 3/2008 | Barsness | G06F 16/24547 |
| 2008/0215544 A1* | 9/2008 | Galindo-Legaria | G06F 16/2452 |
| 2008/0301197 A1* | 12/2008 | Mills | G06F 16/27 |
| 2012/0124045 A1* | 5/2012 | Pendap | G06F 16/24554 707/737 |
| 2017/0011085 A1* | 1/2017 | Douros | G06F 16/2329 |
| 2017/0262319 A1* | 9/2017 | Newburn | G06F 9/5038 |

* cited by examiner

LOCAL IDENTIFIERS FOR DATABASE OBJECTS

TECHNICAL FIELD

This document generally relates to methods and systems for use with computer devices, including networked computing devices. More particularly, this document relates to systems and methods for efficiently executing database queries.

BACKGROUND

In distributed database systems, a database is divided into multiple partitions. For example, a single table may be divided into two or more partitions. Partitions may be transferable between different database management system servers. For example, a single database management system server may be responsible for a set of partitions, which may include less than all of the partitions making up a particular table. Distributed database systems typically utilize a system of globally unique identifiers to refer to database objects such as tables, slices, rows, etc.

BRIEF DESCRIPTION OF DRAWINGS

The present disclosure is illustrated by way of example, and not limitation, in the following figures.

DETAILED DESCRIPTION

Figure 1:
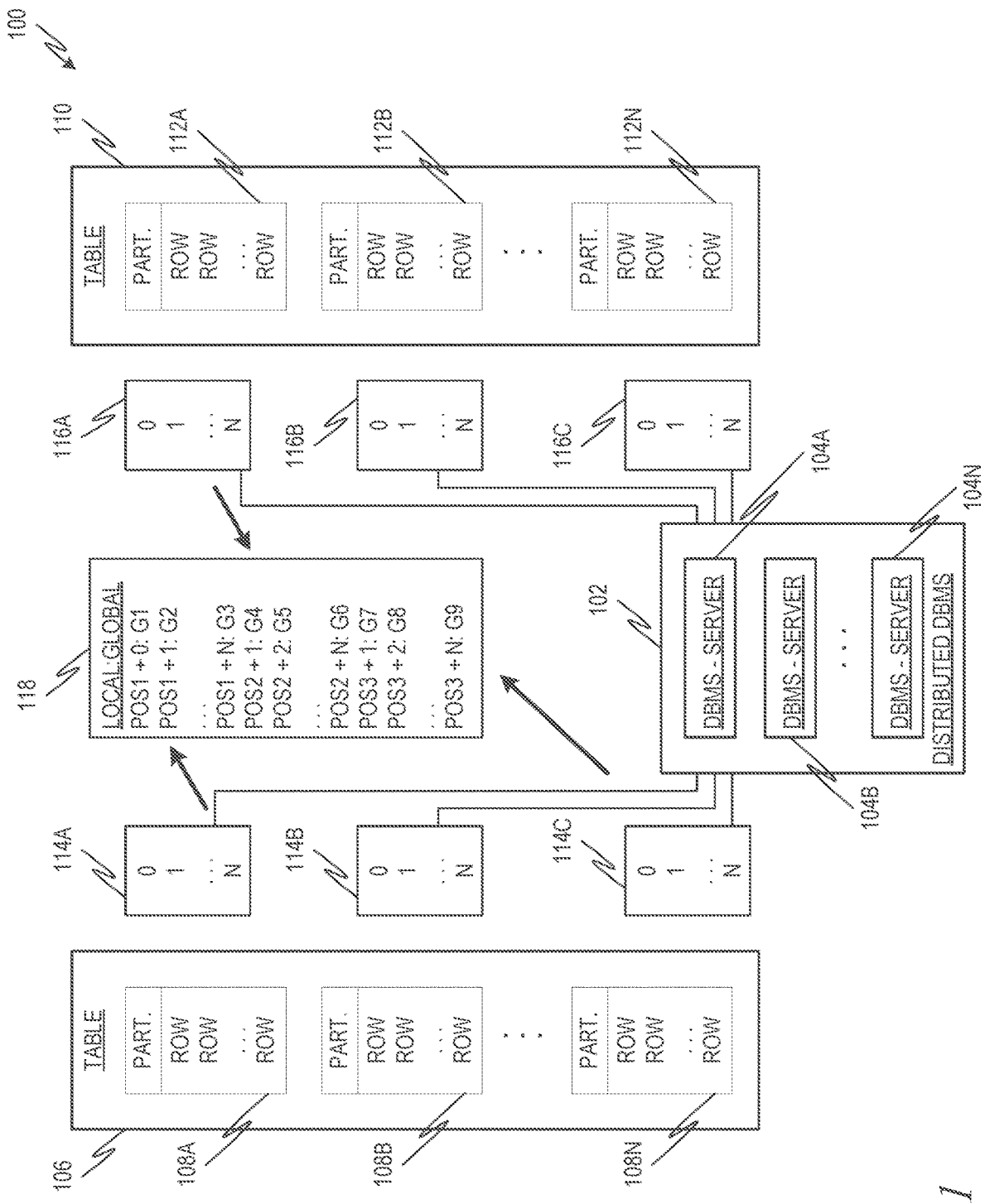
FIG. 1 is a diagram showing one example of a distributed database system for generating and using local identifiers for database objects.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Various examples described herein are directed to generating and/or using local identifiers for database objects, for example, in a distributed database system. In many examples, globally unique identifiers (global identifiers) in a distributed database system are not necessarily assigned sequentially to objects within a particular partition or partitions. That is, consecutive slices, rows, etc., may not necessarily have consecutive global identifiers. For example, in some distributed database systems, global identifiers are assigned by a global sequencer. Global identifiers may be assigned to objects across the distributed database system, for example, in the order in which the objects are created. As a result, knowing the global identifier for a database object in a distributed database system may not provide any information about the surrounding objects. Also, because unique global identifiers are used for a large number of objects (e.g., all objects in the distributed database system) the size of global identifiers can be large.

Global identifiers may be used by a distributed database management system to access particular database objects. For example, a global identifier may be translated to the address of the corresponding object (e.g., primary key for a row, range of primary keys for a slice, etc.) Because of the large number of global identifiers that may be used in a distributed database system, a map data structure, such as a hash map may be used to map global identifiers to corresponding object addresses. For example, to find the address of a database object associated with a particular global identifier, the distributed database management system utilizes a map lookup to obtain the associated physical address from the map structure. When the number of global identifiers in a distributed database system is large, however, a map look-up operation may be computationally costly and inefficient.

Accordingly, various examples described herein utilize local identifiers. A distributed database management system may assign local identifiers to objects in one or more partitions that include operands for a particular execution unit. An execution unit may be any discrete database operation. For example, a database query may include one or more execution units. In some examples, an execution unit may be performed by a single database management system server, for example, on partitions that are managed by the single database management system server.

In some examples, the distributed database management system (e.g., a database management system server thereof) generates a local-to-global map that maps global identifiers to appropriate local identifiers. In some examples, the local identifiers are drawn from a continuous range of values for a given partition and execution unit. In this way, consecutive objects within a partition (e.g., consecutive rows, consecutive slices, etc.) may be assigned consecutive local identifiers. In some examples, local identifiers are maintained, at least until execution of an execution unit is complete. Because only a small subset of all global identifiers are typically used in any given query or execution unit thereof, local identifiers may be efficiently mapped to global identifiers and/or physical addresses at runtime, for example, direct accessing a list or array to implement the local-to-global map.

In some examples, it may be desirable to re-use a set of local identifiers from a first execution unit for a second (e.g., related) execution unit and/or to quickly generate a set of local identifiers for the second execution unit. For example, the second execution unit may take one or more operands that are a result of the first execution unit. For example, a database query may include a view operation requesting the names of customers in a first city who placed orders on a first day. A first execution unit may operate on one or more partitions of an order table to identify the orders placed on the first day. A second execution unit may operate on the identified orders to determine which were placed by customers in the first city. Accordingly, the second execution unit operates on a subset of the partitions operated on by the first execution unit. In some examples, the distributed database management system generates a second set of local identifiers for the second execution unit by applying one or more partition offsets to the set of local identifiers generated for the first execution unit.

FIG. 1 is a diagram showing one example of a distributed database system 100 for generating and using local identifiers for database objects. The distributed database system 100 includes a distributed database management system 102. The distributed database management system 102 may manage the distributed database system 100 including, for example, executing queries and/or execution units thereof utilizing local identifiers, as described herein. The distributed database management system 102 may include one or more DBMS servers 104A, 104B, 104N. A DBMS server 104A, 104B, 104N may manage one or more partitions of one or more tables of the distributed database system 100. In some examples, different DBMS servers 104A, 104B, 104N manage different partitions or sets of partitions. Also, in some examples, management of one or more partitions may be transferred from one DBMS server 104A, 104B, 104N to another. Each DBMS server 104A, 104B, 104N may include one or more physical computing devices, for example, at a common physical location (e.g., server farm, etc.). Different DBMS servers 104A, 104B, 104N may be positioned at the same physical location or at different physical locations.

FIG. 1 also shows example tables 106, 110 of the distributed database system 100 that may be managed by the distributed database management system 102. Although two tables 106, 110 are shown in FIG. 1, in practice a distributed database system, such as the distributed database system 100 may utilize scleras utilizing additional tables. The tables 106, 110 include respective partitions. For example, table 106 includes partitions 108A, 108B, 108N and table 110 includes partitions 112A, 112B, 112N. Although three partitions are shown for each table 106, 110, tables may be divided into any suitable number of partitions. For example, table 106, in some examples, has a different number of partitions than table 110. Responsibility for managing the various partitions 108A, 108B, 108N, 112A, 112B, 112N may be assigned to one or more of the DBMS servers 104A, 104B, 104N. For example, partition 108A may be managed by DBMS server 104A; partition 108B may be managed by DBMS server 104B, etc. Partitions 108A, 108B, 108N, 112A, 112B, 112N may be of different sizes, for example, having different numbers of rows and/or different data sizes.

FIG. 1 also illustrates local identifiers that may be generated and/or used by the DBMS servers 104A, 104B, 104N to execute one or more execution units at the distributed database system 100. In some examples, one or more DBMS servers 104A, 104B, 104N assign partition identifiers 114A, 114B, 114C, 116A, 116B, 116C to the rows of one or more of the partitions 108A, 108B, 108N, 112A, 112B, 112N. Partition identifiers may be assigned to a partition sequentially. For example, the first row at a partition may be assigned a first number, a second row at the partition may be assigned the next integer, a third row at the partition may be assumed the next integer, and so on.

From the partition identifiers for a partition, a DBMS server 104A, 104B, 104N may generate local identifiers for a given execution unit. For example, the DBMS server 104A, 104B, 104N may receive execution unit data describing an execution unit to be executed. The DBMS server 104A, 104B, 104N may identify partitions that include operands for the execution unit. In the example of FIG. 1, partitions 108A, and 108N from table 106 and partition 112A from table 110 include operands for an example execution unit. The DBMS server 104A, 104B, 104N may utilize the partition identifiers to generate local identifiers for the execution unit. For example, the DBMS server 104A, 104B, 104N may generate a local-to-global map 118. The local identifier for any given row may be determined by adding a partition offset to the partition identifier for that row. A partition offset for a partition may indicate a number of rows in partitions added to the local-to-global map 118 before that partition. In the example of FIG. 1, the partition offset for partition 108A (POS1) is zero; the partition offset for partition 108N (POS3) is equal to the number of rows in partition 108A; and the partition offset for partition 112A (POS3) is equal to the sum of the number of rows in partitions 108A and 108N. The local-to-global map 118 may map the local identifiers to corresponding global identifiers (indicated by G1-G9 in FIG. 1) and/or to addresses of the corresponding rows.

In various examples, a DBMS server 104A, 104B, 104N may utilize local identifiers generated for one execution unit to generate a second set of local identifiers for a second execution unit, for example, utilizing partition offsets. For example, consider an execution unit that utilizes operands from partitions 108A and 112A but not from partition 108N. The DBMS server 104A, 104B, 104N may begin from neutral identifiers 114A and 116A to generate a new local-to-global map similar to 118. For example, the partition offset of local identifiers for the partition 112A may indicate the number of rows in the partition 108A.

In some examples, neutral identifiers may be omitted and the DBMS server 104A, 104B, 104N may translate the local-to-global map 118 to a new local-to-global map 118 for the second execution unit. Returning to the last example, the DBMS server 104A, 104B, 104N may delete from the local-to-global map 118 entries corresponding to partitions that do not include operands for the second execution unit (e.g., partition 108N in FIG. 1). New partition offsets may be found for partitions that do include operands for the second execution unit.

In the example of FIG. 1, neutral identifiers and local identifiers are assigned to partitions 108A, 108B, 108N, 112A, 112B, 112N by row. In some examples, however, local identifiers may also be assigned to slices. For example, a slice may include a predetermined number of rows (e.g., 128 k rows, 64 k rows, etc.). The size of a slice may be indicated by the schema or other metadata describing the distributed database system. In other examples, different DBMS servers 104A, 104B, 104N may apply different slice sizes. In some examples, slices may also be assigned neutral identifiers and/or local identifiers. For example, the neutral identifiers of rows in a particular slice may be indicated by a slice neutral identifier and an offset indicating a position of the object in the slice.

Figure 2:
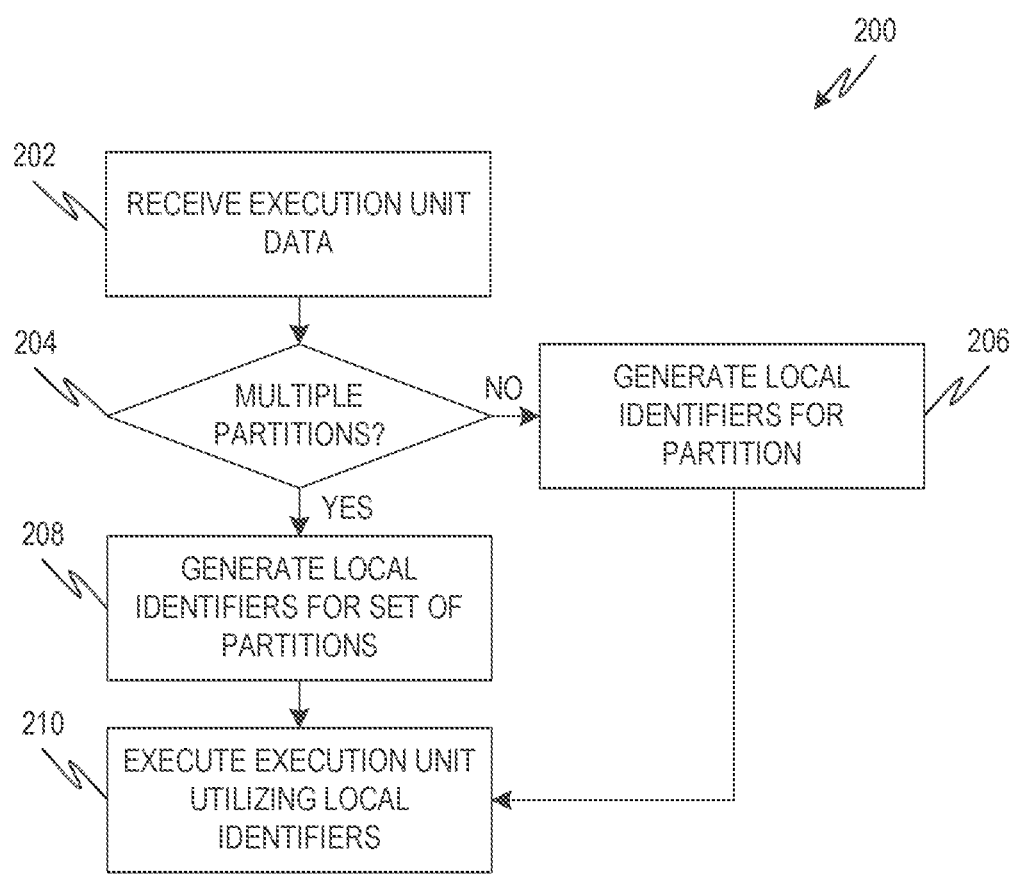
FIG. 2 is a flow chart showing one example of a process flow that may be executed by a database management system (DBMS) server of a distributed database system to execute an execution unit with local identifiers.

FIG. 2 is a flow chart showing one example of a process flow 200 that may be executed by a DBMS server of a distributed database system, such as one of the DBMS servers 104A, 104B, 104N, to execute an execution unit with local identifiers. At operation 202, the DBMS server receives execution unit data describing an execution unit. The execution unit may be an execution unit to be executed at the DBMS server. For example, the execution unit may make up all or part of a query to be executed at the distributed database system. The execution unit data may include operand data describing operands for the execution unit. Operands include one or more rows from one or more partitions managed by the DBMS server that are to be operated on to perform the execution unit.

At operation 204, the DBMS server may determine if the operands described by the execution unit data are stored at multiple partitions (e.g., multiple partitions managed by the DBMS server). If not (e.g., if the operands for the execution unit are at a single partition), then the DBMS server may generate local identifiers for the single partition at operation. Generating local identifiers for the single partition may include, for example, enumerating all or part of the rows, slices, etc., at the single partition in order. For example, when there is a single partition, local identifiers may be similar to the neutral identifiers described herein with respect to FIG. 1.

If the operands for the execution unit are stored at multiple partitions, the DBMS server may generate local identifiers for the set of multiple partitions at operation 208. The DBMS may generate local identifiers in any suitable manner. For example, the DBMS server may generate neutral identifiers for each partition of the set of partitions. The DBMS server may then concatenate the neutral identifiers for the partitions. For example, as described with respect to FIG. 1, the DBMS server may add a partition offset to each neutral identifier. The partition offset for each partition may be equal to a sum of the objects (e.g., rows, slices, etc.) in partitions with lower partition offsets (e.g., partitions that have already been assigned local identifiers). In another example, in lieu of generating neutral identifiers, the DBMS server may assign consecutive local identifiers to objects at the set of partitions, for example, starting with objects in a first partition, then objects in a second partition, and so on.

At operation 210, the DBMS server may execute the execution unit based at least in part on the local identifiers generated at operation 206 and/or at operation 208. For example, the DBMS server may utilize a local-to-global map, such as the map 118 of FIG. 1, to translate between object names indicated by the execution unit data and global identifiers.

Figure 3:
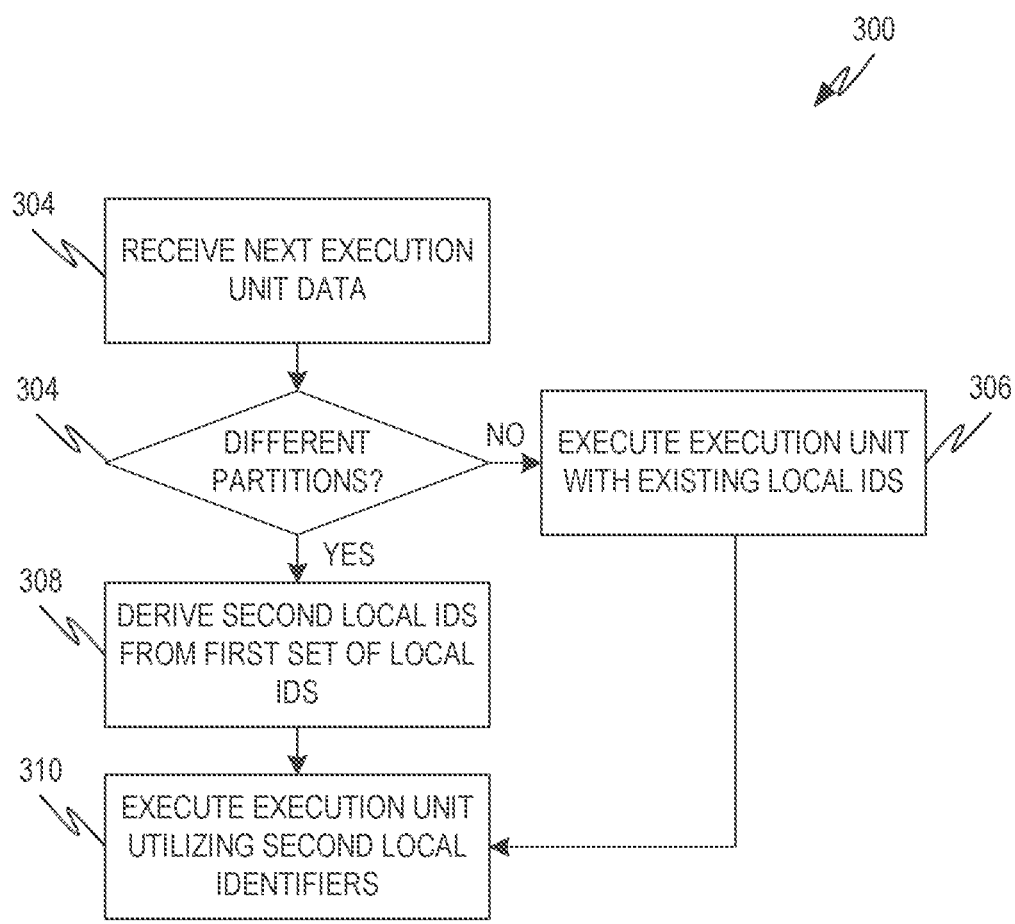
FIG. 3 is a flow chart showing one example of a process flow that may be executed by a DBMS server of a distributed database system to execute an execution unit utilizing an existing set of local identifiers.

FIG. 3 is a flow chart showing one example of a process flow 300 that may be executed by a DBMS server of a distributed database system, such as one of the DBMS servers 104A, 104B, 104N, to execute an execution unit utilizing an existing set of local identifiers. For example, the process flow 300 may be performed after the process flow 200 of FIG. 2. At operation 304, the DBMS server may receive next execution unit data describing a next execution unit to be executed by the DBMS server. In some examples, the next execution unit is part of the same database query as the previous execution unit.

At operation 304, the DBMS server may determine if the next execution unit has operands at a set of partitions that is different than the set of partitions used by the previous execution unit. If not (e.g., if the next execution uses operands from the same set of partitions as the previous execution unit), then the DBMS server may execute the execution unit utilizing the local identifiers previously generated for the previous execution unit at operation 306.

If the next execution unit has operands at a set of partitions different that the set of partitions used by the previous execution unit, the DBMS server may derive a next set of local identifiers from the existing set of local identifiers at operation 305. This may include, for example, removing from the existing set of local identifiers any local identifiers corresponding to partitions that do not include operands for the next execution unit. The partition offsets for remaining local identifiers may be modified. Rows from a common partition may also have a common offset. Also, if there are any partitions to be included that were not considered in the existing set of local identifiers, local identifiers for these may be added, for example, with a newly-generated partition offset. The DBMS server may execute the next execution unit utilizing the next set of local identifiers at operation 310. In some examples, the DBMS server may add an offset difference to local identifiers from the prior set of local identifiers to derive the next set of local identifiers. The offset difference for a row may be a difference between the partition offset for the row in the prior set of local identifiers and the partition offset for the row in the next set of local identifiers.

Figure 4:
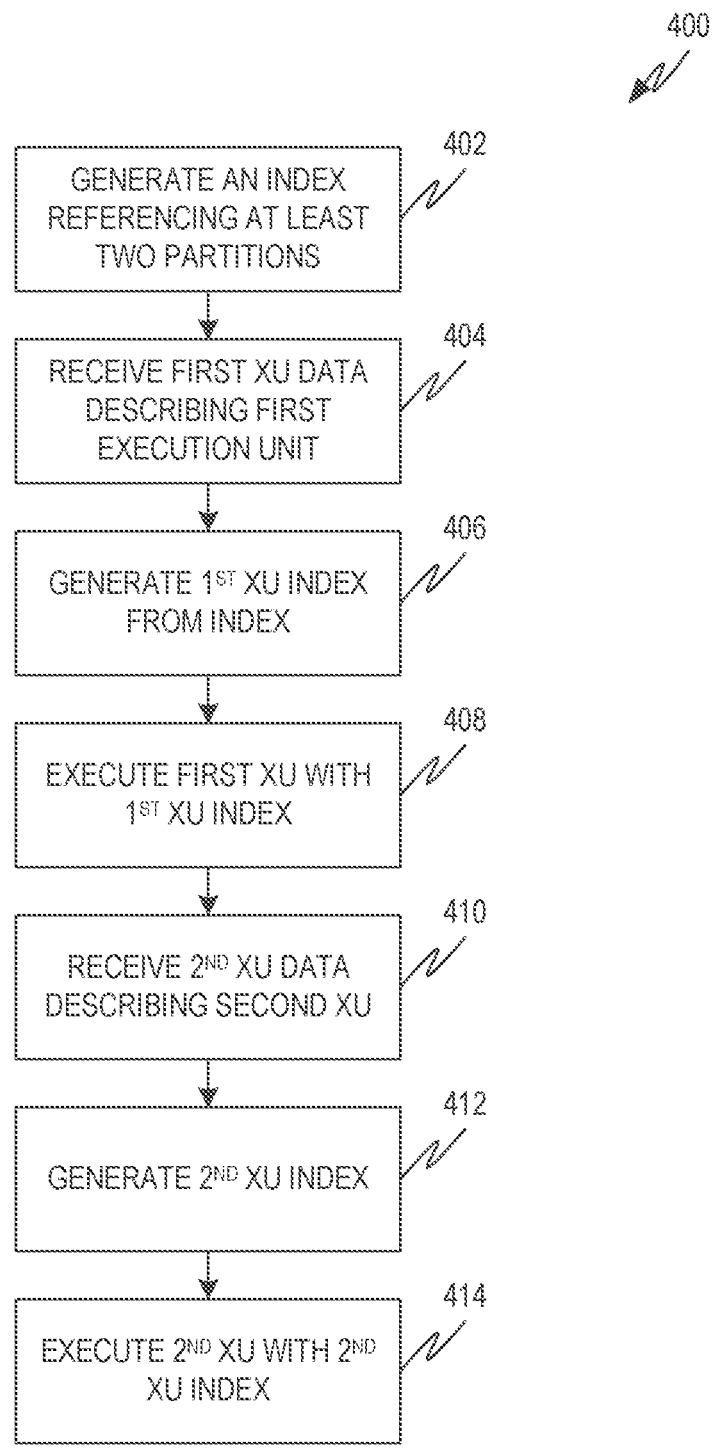
FIG. 4 is allow chart showing one example of a process flow that may be executed by a DBMS server of a distributed database system to execute an execution unit utilizing an index of local identifiers.

FIG. 4 is a flow chart showing one example of a process flow 400 that may be executed by a DBMS server of a distributed database system, such as one of the DBMS servers 104A, 104B, 104N to execute an execution unit utilizing an index of local identifiers. At operation 402, the DBMS server may generate an index referencing at least two partitions. The index, for example, may map rows or other objects from one or more partitions to rows or objects at one or more other partitions. Indices may be used, for example, to increase the efficiency with which the DBMS server performs execution units. For example, a join index may be used by the DBMS server to expedite and/or simplify the execution of a join query or execution unit. Utilizing local identifiers in an index may allow the DBMS server to determine relationships between different rows or other objects without finding the global identifiers for the objects.

At operation 404, the DBMS server may receive first execution unit data describing a first execution unit. At operation 406, the DBMS server may generate a first execution unit index from the index generated at operation 402. This may include, for example, updating the index to refer (e.g., only) to local identifiers at partitions that include operands for the first execution unit. For example, the DBMS server may determine which partition or partitions include operands for the first execution unit. Local identifiers may be removed from and/or added to the index, for example, such that the index includes relationships between the set of partitions that are relevant to the first execution unit. Partitions that do include operands for the first execution unit may be assigned consecutive local identifiers. For example, partition offsets for local identifiers at the set of partitions for the first execution unit may be generated. The partition offsets may be used to update partition offsets previously used by local identifiers at the index. At operation 408, the DBMS server may execute the first execution unit with the updated index.

At operation 410, the DBMS system may receive second execution unit data describing a second execution unit including, for example, operands for the second execution unit. At operation 412, the DBMS may generate an updated index for second execution unit index from an existing index (e.g., either from the updated index generated at operation 402 and/or from the first execution unit index). Generating the second execution unit index may include, for example, adding and/or removing partitions from the prior index, modifying partition offsets based on additions or subtractions of partitions, etc. At operation 414, the DBMS system may execute the second execution unit with the second execution unit index.

To further illustrate the use of local identifiers for database objects, as described herein, consider an example where a DBMS server manages four partitions labeled A-D with example rows indicated by TABLES 1-4 below. TABLES 1-4 show global identifiers for rows at partitions A-D as well as example neutral identifiers for the rows. For example, the DBMS server may assign neutral identifiers to the rows, as described herein, for example, before and/or after execution unit data is received.

TABLE 1

Partition A

| Row Global ID | Row Neutral ID |
|---|---|
| 1000 | 0 |
| 2452 | 1 |
| 3699 | 2 |
| 4721 | 3 |

TABLE 2

Partition B

| Row Global ID | Row Neutral ID |
|---|---|
| 1111 | 0 |
| 2222 | 1 |
| 3333 | 2 |

TABLE 3

Partition C

| Row Global ID | Row Neutral ID |
|---|---|
| 4444 | 0 |
| 5555 | 1 |
| 6666 | 2 |

TABLE 4

Partition D

| Row Global ID | Row Neutral ID |
|---|---|
| 1484 | 0 |
| 1792 | 1 |
| 1801 | 2 |

Next, consider a first execution unit that includes operands from all four partitions. The DBMS server may assign local identifiers to the rows of the partitions A-D, for example, resulting in a local-to-global map indicated by TABLE 5 below:

TABLE 5

Global-to-Local Map

| Global ID | Local ID |
|---|---|
| Partition A - Offset = 0 | |
| 1000 | 0 |
| 2452 | 1 |
| 3699 | 2 |
| 4721 | 3 |
| Partition B - Offset = 4 | |
| 1111 | 4 |
| 2222 | 5 |
| 3333 | 6 |
| Partition C - Offset 7 | |
| 4444 | 7 |
| 5555 | 8 |
| 6666 | 9 |
| Partition D - Offset 10 | |
| 1484 | 10 |
| 1792 | 11 |
| 1801 | 12 |

In this example, the four rows of Partition A are assigned local identifiers 0-3. The three rows of Partition B are assigned local identifiers 4-6. The partition offset for Partition B is 4, indicating the number of rows in Partition A (positioned before Partition B). The partition offset for Partition C is 7, indicating the sum of rows in Partitions A and B. Similarly, the partition offset for Partition D is 10, indicating the sum of rows in Partitions A, B, and C. Although small numbers are utilized in this example for demonstration purposes, in various example distributed database systems, the size of global and/or local identifiers can be large enough that concerns about storage and processing capabilities become relevant. In one example, global identifiers may be 256 bits whereas local identifiers for an execution unit may be much smaller (e.g., 8 bits, 16 bits, 32 bits, etc.). This may allow increased efficiency in execution queries and execution units thereof.

The first execution unit may be or be part of a join query. Accordingly, the DBMS server may generate a join index. For example, Partitions C and D join as indicated by TABLE 6 below:

TABLE 6

Join Index - Global IDs

| Partition C | Partition D |
|---|---|
| 4444 | 1792 |
| 5555 | 1484 |
| 6666 | 1801 |

The same join index, expressed with local identifiers as set forth at the local-to-global map of TABLE 5 is provided by TABLE 7 below:

TABLE 7

Join Index - Local IDs

| Partition C | Partition D |
|---|---|
| 7 | 11 |
| 8 | 10 |
| 9 | 12 |

The same join index expressed with neutral identifiers may be found by subtracting the respective partition offsets from the local identifiers (e.g., 7 for Partition C and 10 for Partition D). This yields TABLE 8:

TABLE 8

| Join Index - Neutral IDs | |
|---|---|
| Partition C | Partition D |
| 0 | 1 |
| 1 | 0 |
| 2 | 2 |

The DBMS server may execute the first execution unit utilizing, for example, the join index of TABLE 7 and/or the join index of TABLE 8.

Now consider a second execution unit that only includes operands only from Partitions A, C, and D (e.g., no operands for the second execution unit are from Partition B. A local-to-global map for the second execution unit is shown by TABLE 9 below:

TABLE 9

| Global-to-Local Map | |
|---|---|
| Global ID | Local ID |
| Partition A - Offset = 0 | |
| 1000 | 0 |
| 2452 | 1 |
| 3699 | 2 |
| 4721 | 3 |
| Partition C - Offset 4 | |
| 4444 | 4 |
| 5555 | 5 |
| 6666 | 6 |
| Partition D - Offset 7 | |
| 1484 | 7 |
| 1792 | 8 |
| 1801 | 9 |

As shown, because Partition B is omitted, the partition offset for Partitions C and D are changed to 4 and 7, respectively. In some examples, the DBMS server may adjust the join index from the first execution unit for use with the set of local identifiers for the second execution unit, for example, as shown in TABLE 10 below:

TABLE 10

| Join Index - Local IDs - Second XU | |
|---|---|
| Partition C | Partition D |
| 4 | 8 |
| 5 | 7 |
| 6 | 9 |

Figure 5:
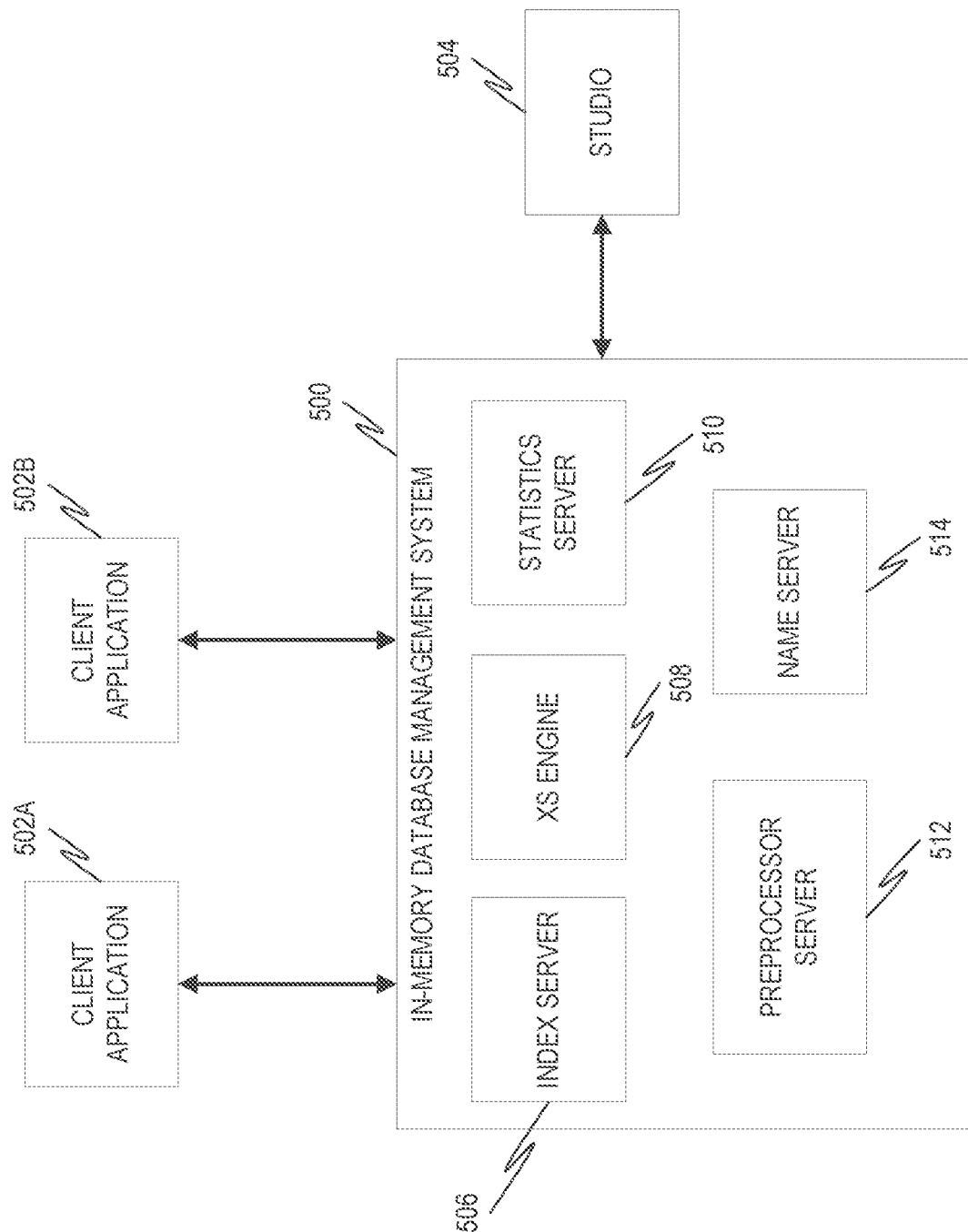
FIG. 5 is a diagram illustrating an example of an in-memory database management system that may be used to implement a web application in some examples of the network virtualization systems and methods described herein.

FIG. 5 is a diagram illustrating an example of an in-memory database management system 500. For example, the database management system 500 may describe an implementation at a DBMS server, for example, as described herein. An in-memory database stores data primarily at a main memory, such as a random access memory (RAM). This is different than databases that primarily employ a disk storage mechanism. In some examples, the database management system 500 may be or include an example of the HANA system from SAP SE of Walldorf, Germany. Although various features of web applications are described herein in the context of an in-memory database, web application security with service workers, as described herein, may be generally implemented for any type of web application.

The in-memory database management system 500 may be coupled to one or more client applications 502A, 502B. Client applications 502A, 502B may execute one or more queries utilizing data from the database including, for example, presenting a user interface (UI) to one or more users, entering data, accessing data, etc. The client applications 502A, 502B may communicate with the in-memory database management system 500 through a number of different protocols, including SQL, Multidimensional Expressions (MDX), Hypertext Transfer Protocol (HTTP), Representational State Transfer (REST), Hypertext Markup Language (HTML).

FIG. 5 also shows a studio 504 that may be used to perform modeling by accessing the in-memory database management system 500. In some examples, the studio 504 may allow complex analysis to be performed on data drawn not only from real-time event data and windows, but also from stored database information. The in-memory database management system 500 may comprise a number of different components, including an index server 506, an XS engine 508, a statistics server 510, a preprocessor server 512, and a name server 514. These components may operate on a single computing device or may be spread among multiple computing devices (e.g., separate servers). The index server 506 contains the actual data and the engines for processing the data. It may also coordinate and uses the other servers.

The XS engine 508 allows clients to connect to the in-memory database management system 500 using web protocols, such as HTTP. Although the XS engine 508 is illustrated as a component of the in-memory database management system 500, in some examples, the XS engine 508 may be implemented as one or more Application Program Interfaces (APIs) and/or services positioned between the client applications 502A, 502B and the in-memory database management system 500. For example, the XS engine 508 may be configured to process client requests received in languages other than SQL such as, for example, MDX, HTTP, REST, HTML, etc.

The statistics server 510 collects information about status, performance, and resource consumption from all of the other server components. The statistics server 510 can be accessed from the studio 304 to obtain the status of various alert monitors.

The preprocessor server 512 is used for analyzing text data and extracting the information on which the text search capabilities are based.

The name server 514 holds information about the database topology. This is used in a distributed system with instances of the database on different hosts. The name server 514 knows where the components are running and which data is located on which server. In an example embodiment, a separate enqueue server may operate in the manner described above with respect to enqueue servers, specifically with regard to creating and managing light-weight enqueue sessions.

Figure 6:
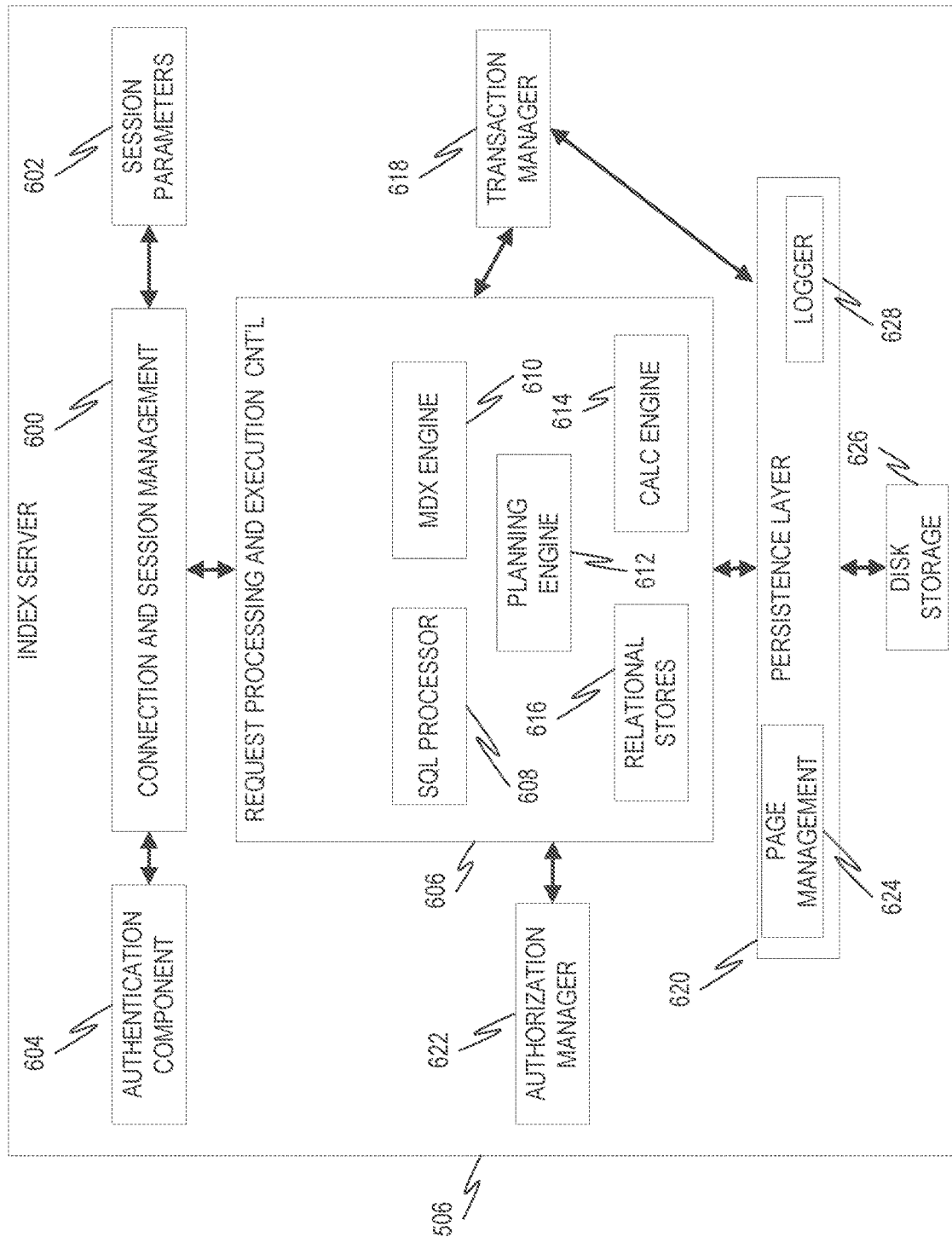
FIG. 6 is a diagram illustrating an example of the index server of FIG. 5.

FIG. 6 is a diagram illustrating an example of the index server 506. Specifically, the index server 506 of FIG. 5 is depicted in more detail. The index server 306 includes a connection and session management component 600, which is responsible for creating and managing sessions and connections for the database clients (e.g., client applications 502A, 502B). Once a session is established, clients can communicate with the database management system 500 using SQL statements. For each session, a set of session parameters 602 may be maintained, such as auto commit, current transaction isolation level, etc. Users (e.g., system administrators, developers) may be authenticated by the database management system 300 itself (e.g., by logging in with log-in information such as a user name and password, using an authentication component 604), or authentication can be delegated to an external authentication provider such as a Lightweight Directory Access Protocol (LDAP) directory.

Client queries can be analyzed and executed by a set of components summarized as request processing and execution control 606. An SQL processor 608 checks the syntax and semantics of the client SQL statements and generates a logical execution plan. In some examples, generating the logical execution plan includes generating and/or utilizing local identifiers for partition objects, as described herein. For example, generating a logical execution plan may include executing some or all of the process flow 200, 300, 400 described herein. MDX is a language for querying and manipulating multidimensional data stored in online analytical processing (OLAP) cubes. As such, an MDX engine 610 may be provided to allow for the parsing and executing of MDX commands. A planning engine 612 allows applications to execute basic planning operations in the database layer. One such operation is to create a new version of a dataset as a copy of an existing dataset, while applying filters and transformations.

A calculation engine 614 implements the various SQL script and planning operations. The calculation engine 614 creates a logical execution plan for calculation models derived from SQL script, MDX, planning, and domain-specific models. This logical execution plan may include, for example, breaking up a model into operations that can be processed in parallel. The data is stored in relational stores 616, which implement a relational database in main memory. Each SQL statement may be processed in the context of a transaction. New sessions are implicitly assigned to a new transaction. A transaction manager 618 coordinates database transactions, controls transactional isolation, and keeps track of running and closed transactions. When a transaction is committed or rolled back, the transaction manager 618 informs the involved engines about this event so they can execute needed actions. The transaction manager 618 also cooperates with a persistence layer 620 to achieve atomic and durable transactions.

An authorization manager 622 is invoked by other database system components to check whether the user has the specified privileges to execute the requested operations. The database management system 500 allows for the granting of privileges to users or roles. A privilege grams the right to perform a specified operation on a specified object.

The persistence layer 620 ensures that the database is restored to the most recent committed state after a restart and that transactions are either completely executed or completely undone. To achieve this goal in an efficient way, the persistence layer 620 uses a combination of write-ahead logs, shadow paging, and save points. The persistence layer 620 also offers a page management interface 624 for writing and reading data to a separate disk storage 626, and also contains a logger 628 that manages the transaction log. Log entries can be written implicitly by the persistence layer 620 when data is written via the persistence interface or explicitly by using a log interface.

Figure 7:
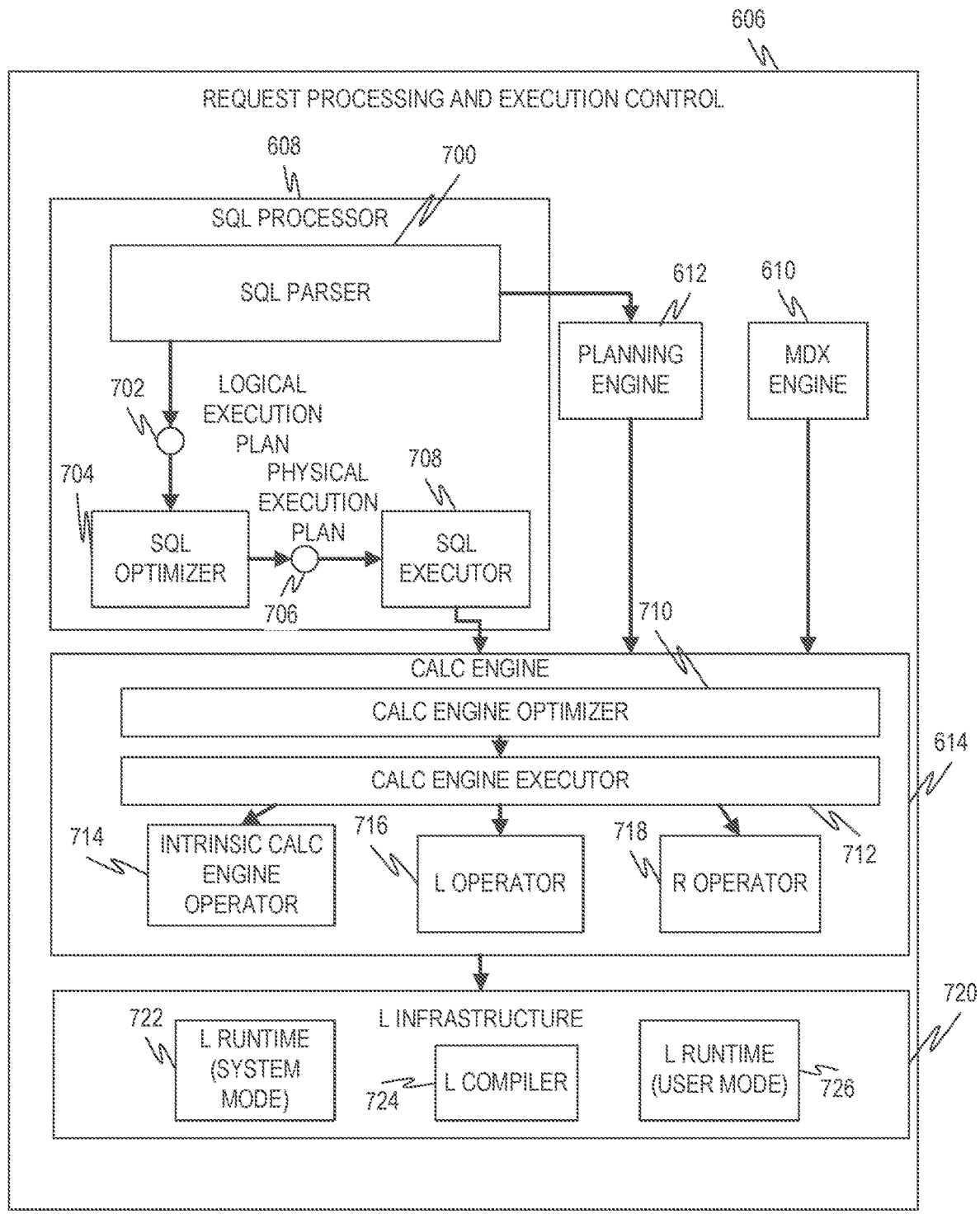
FIG. 7 is a diagram illustrating one example of the request processing and execution control of FIG. 6.

FIG. 7 is a diagram illustrating one example of the request processing and execution control 606. This diagram depicts the request processing and execution control 606 of FIG. 6 in more detail. The SQL processor 608 contains an SQL parser 700, which parses the SQL statement and generates a logical execution plan 702, which it passes to an SQL optimizer 704. The SQL optimizer 704 optimizes the logical execution plan 702 and converts it to a physical execution plan 706, which it then passes to a SQL executor 708. The calculation engine 614 implements the various SQL script and planning operations, and includes a calc engine optimizer 710, which optimizes the operations, and a calc engine executor 712, which executes the operations, as well as an intrinsic calc engine operator 714, an L operator 716, and an R operator 718.

An L infrastructure 720 includes a number of components to aid in the running of L procedures, including an L-runtime (system mode) 722, an L compiler 724, and an L-runtime (user mode) 726.

EXAMPLES

Example 1 is a database management system server of a distributed database system, the database management system server comprising a processor and memory in communication with the processor, wherein the database management system server is programmed to perform operations comprising: receiving first execution unit data describing a first execution unit of a first database query, the first execution unit data comprising first operand data describing a set of operands for the first execution unit; determining, by the database management system server, that the first operand data describes at least one operand from a first partition of the distributed database system and at least one operand from a second partition of the distributed database system; generating, by the database management system server, a first set of local identifiers describing rows at the first partition; generating, by the database management system server, first set of local identifiers describing rows at the second partition; and executing the first execution unit at the distributed database system based at least in part on the first set of local identifiers describing rows at the first partition and the first set of local identifiers describing rows at the second partition.

In Example 2, the subject matter of Example 1 optionally includes wherein the database management system server is further programmed to perform operations comprising: receiving second execution unit data describing a second execution unit, the second execution unit data comprising second operand data describing a set of operands for the second execution unit; determining that the second operand data describes at least one operand from the first partition; generating a second set of local identifiers describing rows at the first partition at least in part by adding a first offset to a local identifier selected from the first set of local identifiers describing rows at the first partition; and executing the second execution unit al the distributed database system based at least in part on the second set of local identifiers describing rows at the first partition.

In Example 3, the subject matter of Example 2 optionally includes wherein the second operand data also describes at least one operand from a third partition of the distributed database system, wherein the last partition and the third partition are pan of a common table.

In Example 4, the subject matter of any one or more of Examples 1-3 optionally includes wherein the database management system server is further programmed to perform operations comprising, generating an index relating at least a portion of the rows at the first partition and at least a portion of the rows of the second partition, wherein the index is based at least in part on the first set of local identifiers.

In Example 5, the subject matter of Example 4 optionally includes wherein the database management system server is further programmed to perform operations comprising: receiving a second execution unit comprising second operand data describing a set of operands for the second execution unit determining that the second operand data describes at least one operand from the first partition; generating an updated index at least in part by adding a first offset difference to a first local identifier of the index, wherein the first offset difference is a difference between a partition offset for the first partition from the first set of local identifiers and a partition offset for the first partition in a second set of local identifiers; and executing the second execution unit at the distributed database system based at least in part on the updated index.

In Example 6, the subject matter of any one or more of Examples 1-5 optionally includes wherein a first local identifier of the first set of local identifiers describing rows at the first partition comprises a slice identifier indicating a slice at the first partition and a row offset indicating an offset of a first row at the first partition.

In Example 7, the subject matter of any one or more of Examples 1-6 optionally includes wherein a first local identifier of the first set of local identifiers describing rows at the first partition comprises a first portion indicating a partition neutral identifier and a second portion indicating a first execution unit partition offset for the first partition.

In Example 8, the subject matter of any one or more of Examples 1-7 optionally includes wherein the database management system server is further programmed to perform operations comprising: receiving second execution unit data describing a second execution unit, the second execution unit data comprising second operand data describing a set of operands for the second execution unit; determining that the second operand data describes at least one operand from the first partition; generating a second set of local identifiers describing rows at the first partition based at least in part on a second execution unit partition offset; and executing the second execution unit based at the distributed database system at least in part on the second set of local identifiers describing rows at the first partition.

Example 9 is a method of executing database queries in a distributed database management system, the method comprising: receiving, by a database management system server, first execution unit data describing a first execution unit of a first database query, the first execution unit data comprising first operand data describing a set of operands for the first execution unit; determining, by the database management system server, that the first operand data describes at least one operand from a first partition of the distributed database system and at least one operand from a second partition of the distributed database system; generating, by the database management system server, a first set of local identifiers describing rows at the first partition; generating, by the database management system server, a first set of local identifiers describing rows at the second partition; and executing, by the database management system server, the first execution unit at the distributed database system based at least in part on the first set of local identifiers describing rows at the first partition and the first set of local identifiers describing rows at the second partition.

In Example 10, the subject matter of Example 9 optionally includes receiving, by the database management system server, second execution unit data describing a second execution unit, the second execution unit data comprising second operand data describing a set of operands for the second execution unit; determining, by the database management system server, that the second operand data describes at least one operand from the first partition; generating, by the database management system server, a second set of local identifiers describing rows at the first partition at least in part by adding a first offset to a local identifier selected from the first set of local identifiers describing rows at the first partition; and executing, by the database management system server, the second execution unit at the distributed database system based at least in part on the second set of local identifiers describing rows al the first partition.

In Example 11, the subject matter of Example 10 optionally includes wherein the second operand data also describes at least one operand from a third partition of the distributed database system, wherein the first partition and the third partition are part of a common table.

In Example 12, the subject matter of any one or more of Examples 9-11 optionally includes generating, by the database management system server, an index relating at least a portion of the rows at the first partition and at least a portion of the rows of the second partition, wherein the index is based at least in part on the first set of local identifiers.

In Example 13, the subject matter of Example 12 optionally includes receiving, by the database management system server, a second execution unit comprising second operand data describing a set of operands for the second execution unit; determining, by the database management system server, that the second operand data describes at least one operand from the first partition; generating, by the database management system server, an updated index at least in part by adding a first offset difference to a first local identifier of the index, wherein the first offset difference is a difference between a partition offset for the first partition from the first set of local identifiers and a partition offset for the first partition in a second set of local identifiers, and executing, by the database management system server, the second execution unit at the distributed database system based at least in part on the updated index.

In Example 14, the subject matter of any one or more of Examples 9-13 optionally includes wherein a first local identifier of the first set of local identifiers describing rows at the first partition comprises a slice identifier indicating a slice at the first partition and a row offset indicating an offset of a first row at the first partition.

In Example 15, the subject matter of any one or more of Examples 9-14 optionally includes wherein a first local identifier of the first set of local identifiers describing rows at the first partition comprises a first portion indicating a partition neutral identifier and a second portion indicating a first execution unit partition offset for the first partition.

In Example 16, the subject matter of any one or more of Examples 9-15 optionally includes receiving, by the database management system server, second execution unit data describing a second execution unit, the second execution unit data comprising second operand data describing a set of operands for the second execution unit; determining, by the database management system server, that the second operand data describes at least one operand from the first partition; generating, by the database management system server, a second set of local identifiers describing rows at the first partition based at least in part on a second execution unit partition offset; and executing, by the database management system server, the second execution unit at the distributed database system based at least in part on the second set of local identifiers describing rows at the first partition.

Example 17 is a machine-readable medium comprising instructions stored thereon that, when executed by at least one processor, cause the at least one processor to perform operations comprising: receiving first execution unit data describing a first execution unit of a first database query at a distributed database system, the first execution unit data comprising first operand data describing a set of operands for the first execution unit; determining that the first operand data describes at least one operand from a first partition of the distributed database system and at least one operand from a second partition of the distributed database system; generating a first set of local identifiers describing rows at the first partition; generating a first set of local identifiers describing rows at the second partition; and executing the first execution unit based at least in part on the first set of local identifiers describing rows at the first partition and the first set of local identifiers describing rows at the second partition.

In Example 18, the subject matter of Example 17 optionally includes wherein the machine readable medium further comprises instructions stored thereon that, when executed by the at least one processor, cause the at least one processor to perform operations comprising: receiving second execution unit data describing a second execution unit, the second execution unit data comprising second operand data describing a set of operands for the second execution unit; determining that the second operand data describes at least one operand from the first partition; generating a second set of local identifiers describing rows at the first partition at least in part by adding a first offset to a local identifier selected from the first set of local identifiers describing rows at the first partition; and executing the second execution unit at the distributed database system based at least in part on the second set of local identifiers describing rows at the first partition.

In Example 19, the subject matter of Example 18 optionally includes wherein the second operand data also describes at least one operand from a third partition of the distributed database system, wherein the first partition and the third partition are part of a common table.

In Example 20, the subject matter ref any one or more of Examples 17-19 optionally includes wherein the machine readable medium further comprises instructions stored thereon that, when executed by the at least one processor, cause the at least one processor to perform operations comprising generating an index relating at least a portion of the rows at the first partition and at least a portion of the rows of the second partition, wherein the index is based at least in part on the first set of local identifiers.

Figure 8:
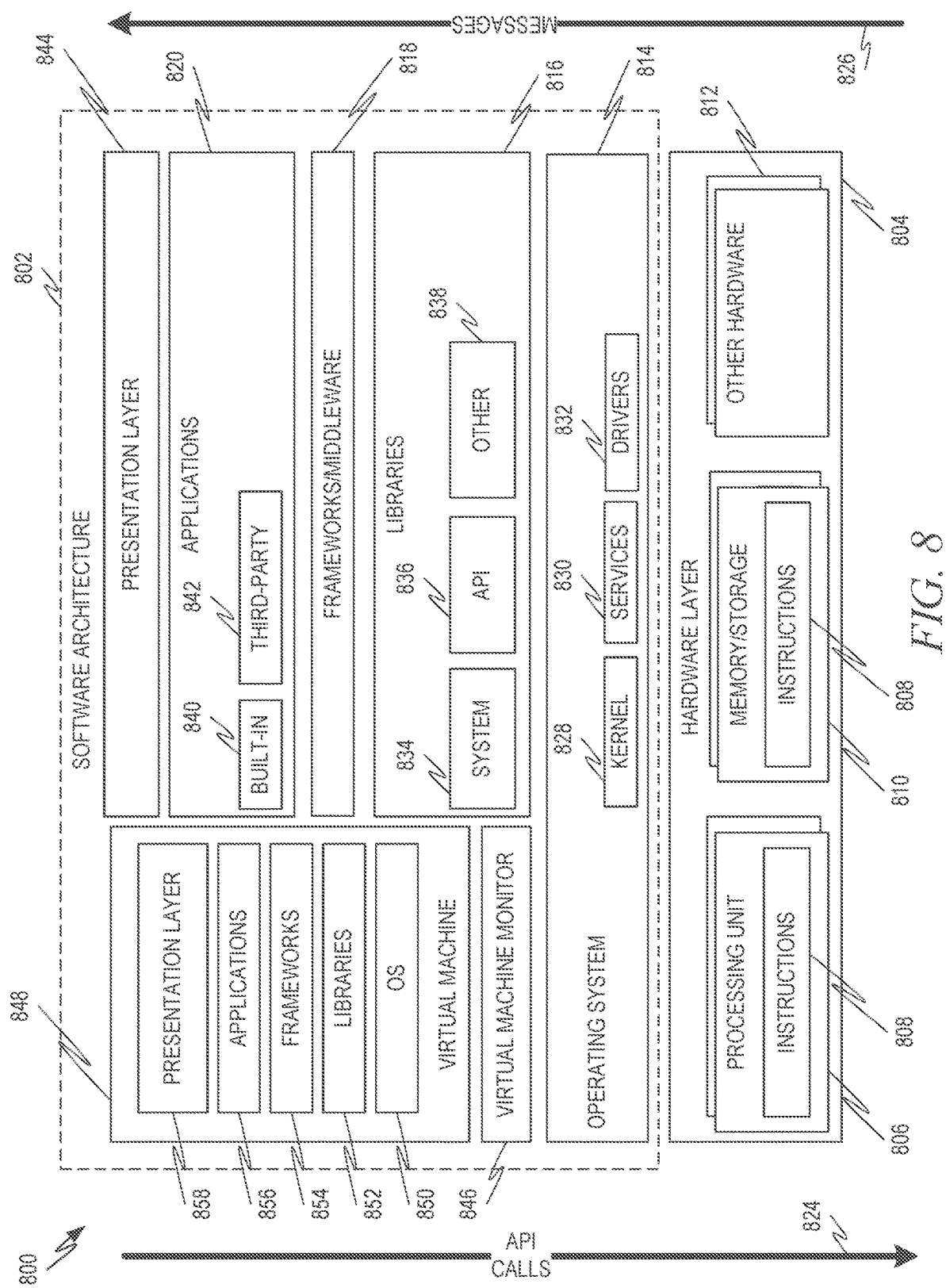
FIG. 8 is a block diagram showing one example of a software architecture for a computing device.

FIG. 8 is a block diagram 800 showing one example of a software architecture 802 for a computing device. The architecture 802 may be used in conjunction with various hardware architectures, for example, as described herein. FIG. 8 is merely a non-limiting example of a software architecture and many other architectures may be implemented to facilitate the functionality described herein. A representative hardware layer 804 is illustrated and can represent, for example, any of the above referenced computing devices. In some examples, the hardware layer 804 may be implemented according to the architecture of the computer system 900 of FIG. 9.

The representative hardware layer 804 comprises one or more processing units 806 having associated executable instructions 808. Executable instructions 808 represent the executable instructions of the software architecture 802, including implementation of the methods, modules, subsystems, and components, and so forth described herein and may also include memory and/or storage modules 810, which also have executable instructions 808. Hardware layer 804 may also comprise other hardware as indicated by other hardware 812, which represents any other hardware of the hardware layer 804, such as the other hardware illustrated as part of computer system 900.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820, and presentation layer 844. Operationally, the applications 820 and/or other components within the layers may invoke API calls 824 through the software stack and access a response, returned values, and so forth illustrated as messages 826 in response to the API calls 824. The layers illustrated are representative in nature and not all software architectures have all layers. For example, some mobile or special purpose operating systems may not provide a frameworks/middleware layer 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of an interrupt and, in response, cause the architecture 802 to pause its current processing and execute an interrupt service routine (ISR) when an interrupt is accessed.

The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than to interface directly with the underlying operating system 814 functionality (e.g., kernel 828, services 830 and/or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 8D in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules. In some examples, libraries 816 may provide one or more APIs serviced by a message oriented middleware.

The frameworks 818 (also sometimes referred to as middleware) may provide a higher-level common infrastructure that may be utilized by the applications 820 and/or other software components/modules. For example, the frameworks 818 may provide various graphic user interface (GUI) functions, high-level resource management, high-level location services, and so forth. The frameworks 818 may provide a broad spectrum of other APIs that may be utilized by the applications 820 and/or other software components/modules, some of which may be specific to a particular operating system or platform.

The applications 820 include built-in applications 840 and/or third-party applications 842. Examples of representative built-in applications 840 may include, but are not limited to, a contacts application, a browser application, a book reader application, a location application, a media application, a messaging application, and/or a game application. Third-party applications 842 may include any of the built-in applications 840 as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 842 may invoke the API calls 824 provided by the mobile operating system such as operating system 814 to facilitate functionality described herein.

The applications 820 may utilize built-in operating system functions (e.g., kernel 828, services 830 and/or drivers 832), libraries (e.g., system 834, APIs 836, and other libraries 838), frameworks/middleware 818 to create user interfaces to interact with users of the system. Alternatively, or additionally, in some systems interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. A virtual machine creates a software environment where applications/modules can execute as if they were executing on a hardware computing device. A virtual machine 848 is hosted by a host operating system (operating system 814) and typically, although not always, has a virtual machine monitor 846, which manages the operation of the virtual machine 848 as well as the interface with the host operating system (i.e., operating system 814). A software architecture executes within the virtual machine 848 such as an operating system 850, libraries 852, frameworks/middleware 854, applications 856 and/or presentation layer 858. These layers of software architecture executing within the virtual machine 848 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 9:
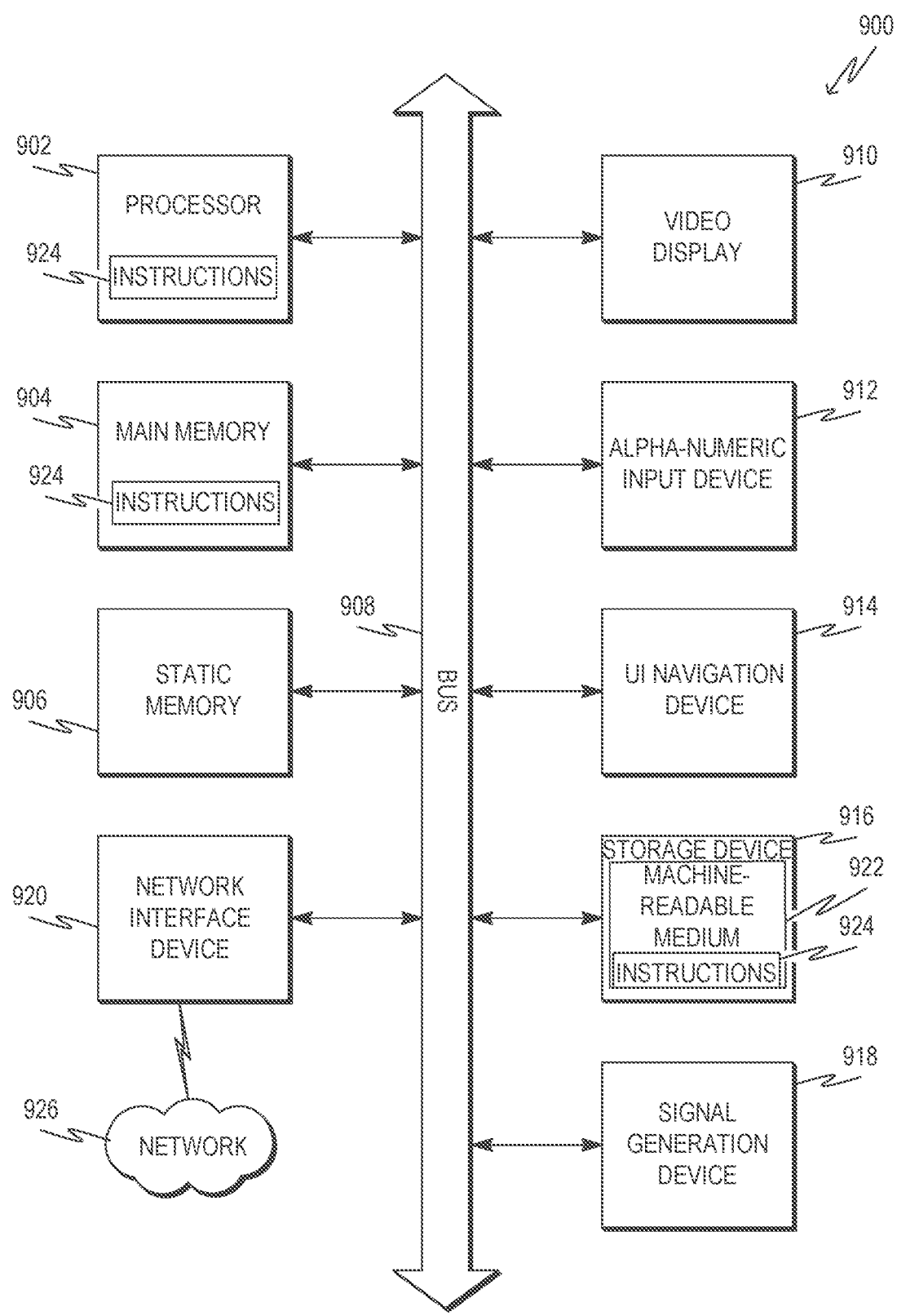
FIG. 9 is a block diagram of a machine in the example form of a computer system within which instructions may be executed for causing the machine to perform any one or more of the methodologies discussed herein.

FIG. 9 is a block diagram of a machine in the example form of a computer system 900 within which instructions 924 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or a touch-sensitive display screen), a UI navigation (or cursor control) device 914 (e.g., a mouse), a disk drive or storage device 916, a signal generation device 918 (e.g., a speaker), and a network interface device 920.

Machine-Readable Medium

The disk drive device 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media 922.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding, or carrying instructions 924 for execution by the machine and that cause the machine to perform any one or more of the methodologies of the present disclosure, or that is capable of storing, encoding, or carrying data structures utilized by or associated with such instructions 924. The term "machine-readable medium" shall accordingly be taken to include, but not be limited to, solid-state memories, and optical and magnetic media. Specific examples of machine-readable media 922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 924 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A database management system server of a distributed database system, the database management system server comprising a processor and memory in communication with the processor, wherein the database management system server is programmed to perform operations comprising:

receiving first execution unit data describing a first execution unit of a first database query, the first execution unit data comprising first operand data describing a set of operands for the first execution unit, the first operand data describing at least one operand from a first partition of the distributed database system and at least one operand from a second partition of the distributed database system;

generating, by the database management system server, a first local-to-global map comprising a first set of local identifiers relating rows at the first partition to corresponding global identifiers for the rows at the first partition;

executing the first execution unit at the distributed database system based at least in part on the first local-to-global map;

receiving second execution unit data describing a second execution unit, the second execution unit data comprising second operand data describing a set of operands for the second execution unit, the second operand data describing at least one operand from the first partition;

generating, by the database management server, a second local-to-global map comprising a second set of local identifiers relating rows at the first partition to corresponding global identifiers for the rows at the first partition, the generating of the second local-to-global map comprising:

offsetting a first local identifier of the first set of local identifiers by a first amount to generate a first local identifier of the second set of local identifiers; and offsetting a second local identifier of the second set of local identifiers by the first amount to generate a second local identifier of the second set of local identifiers;

generating an index relating at least a portion of the rows at the first partition and at least a portion of the rows of the second partition, wherein the index is based at least in part on the first set of local identifiers;

generating an updated index at least in part by adding a first offset difference to a first local identifier of the index, wherein the first offset difference is a difference between a partition offset for the first partition from the first set of local identifiers and a partition offset for the first partition in a second set of local identifiers; and executing the second execution unit at the distributed database system based at least in part on the updated index.

2. The database management system server of claim 1, wherein the database management system server is further programmed to perform operations comprising executing the second execution unit at the distributed database system based at least in part on the second local-to-global map.

3. The database management system server of claim 1, wherein the second operand data also describes at least one operand from a third partition of the distributed database system, wherein the first partition and the third partition are part of a common table.

4. The database management system server of claim 1, wherein a first local identifier of the first set of local identifiers describing rows at the first partition comprises a slice identifier indicating a slice at the first partition and a row offset indicating an offset of a first row at the first partition.

5. The database management system server of claim 1, wherein a first local identifier of the first set of local identifiers describing rows at the first partition comprises a first portion indicating a partition neutral identifier and a second portion indicating a first execution unit partition offset for the first partition.

6. A method of executing database queries in a distributed database management system, the method comprising:
- receiving, by a database management system server, first execution unit data describing a first execution unit of a first database query, the first execution unit data comprising first operand data describing a set of operands for the first execution unit, the first operand data describing at least one operand from a first partition of the distributed database system and at least one operand from a second partition of the distributed database system;
- generating, by the database management system server, a first local-to-global map comprising a first set of local identifiers relating rows at the first partition to corresponding global identifiers for the rows at the first partition;
- executing, by the database management system server, the first execution unit at the distributed database system based at least in part on the first local-to-global map;
- receiving second execution unit data describing a second execution unit, the second execution unit data comprising second operand data describing a set of operands for the second execution unit, the second operand data describing at least one operand from the first partition; and
- generating a second local-to-global map comprising a second set of local identifiers relating rows at the first partition to corresponding global identifiers for the rows at the first partition, the generating of the second local-to-global map comprising:
  - offsetting a first local identifier of the first set of local identifiers by a first amount to generate a first local identifier of the second set of local identifiers; and
  - offsetting a second local identifier of the second set of local identifiers by the first amount to generate a second local identifier of the second set of local identifiers;
- generating an index relating at least a portion of the rows at the first partition and at least a portion of the rows of the second partition, wherein the index is based at least in part on the first set of local identifiers;
- generating an updated index at least in part by adding a first offset difference to a first local identifier of the index, wherein the first offset difference is a difference between a partition offset for the first partition from the first set of local identifiers and a partition offset for the first partition in a second set of local identifiers; and
- executing the second execution unit at the distributed database system based at least in part on the updated index.

7. The method of claim 6, further comprising executing, by the database management system server, the second execution unit at the distributed database system based at least in part on the second local-to-global map.

8. The method of claim 6, wherein the second operand data also describes at least one operand from a third partition of the distributed database system, wherein the first partition and the third partition are part of a common table.

9. The method of claim 6, wherein a first local identifier of the first set of local identifiers describing rows at the first partition comprises a slice identifier indicating a slice at the first partition and a row offset indicating an offset of a first row at the first partition.

10. The method of claim 6, wherein a first local identifier of the first set of local identifiers describing rows at the first partition comprises a first portion indicating a partition neutral identifier and a second portion indicating a first execution unit partition offset for the first partition.

11. A non-transitory machine-readable medium comprising instructions stored thereon that, when executed by at least one processor, cause the at least one processor to perform operations comprising:
- receiving first execution unit data describing a first execution unit of a first database query at a distributed database system, the first execution unit data comprising first operand data describing a set of operands for the first execution unit, the first operand data describing at least one operand from a first partition of the distributed database system and at least one operand from a second partition of the distributed database system;
- generating a first local-to-global map comprising a first set of local identifiers relating rows at the first partition to corresponding global identifiers for the rows at the first partition;
- executing the first execution unit based at least in part on the first local-to-global map;
- receiving second execution unit data describing a second execution unit, the second execution unit data comprising second operand data describing a set of operands for the second execution unit, the second operand data describing at least one operand from the first partition;
- generating a second local-to-global map comprising a second set of local identifiers relating rows at the first partition to corresponding global identifiers for the rows at the first partition, the generating of the second local-to-global map comprising:
  - offsetting a first local identifier of the first set of local identifiers by a first amount to generate a first local identifier of the second set of local identifiers; and
  - offsetting a second local identifier of the second set of local identifiers by the first amount to generate a second local identifier of the second set of local identifiers;
- generating an index relating at least a portion of the rows at the first partition and at least a portion of the rows of the second partition, wherein the index is based at least in part on the first set of local identifiers;
- generating an updated index at least in part by adding a first offset difference to a first local identifier of the index, wherein the first offset difference is a difference between a partition offset for the first partition from the first set of local identifiers and a partition offset for the first partition in a second set of local identifiers; and
- executing the second execution unit at the distributed database system based at least in part on the updated index.

12. The machine readable medium of claim 11, wherein the machine readable medium further comprises instructions stored thereon that, when executed by the at least one processor, cause the at least one processor to perform operations comprising executing the second execution unit at the distributed database system based at least in part on the second local-to-global map.

13. The machine readable medium of claim 11, wherein the second operand data also describes at least one operand from a third partition of the distributed database system, wherein the first partition and the third partition are part of a common table.

14. The machine readable medium of claim 11, wherein a first local identifier of the first set of local identifiers describing rows at the first partition comprises a slice identifier indicating a slice at the first partition and a row offset indicating an offset of a first row at the first partition.

15. The machine readable medium of claim 11, wherein a first local identifier of the first set of local identifiers describing rows at the first partition comprises a first portion indicating a partition neutral identifier and a second portion indicating a first execution unit partition offset for the first partition.

* * * * *